Aug. 27, 1940.   E. L. TORNQUIST   2,212,869
REVERSIBLE HEATING AND COOLING MEANS AND METHOD
Filed Sept. 27, 1938    3 Sheets-Sheet 1
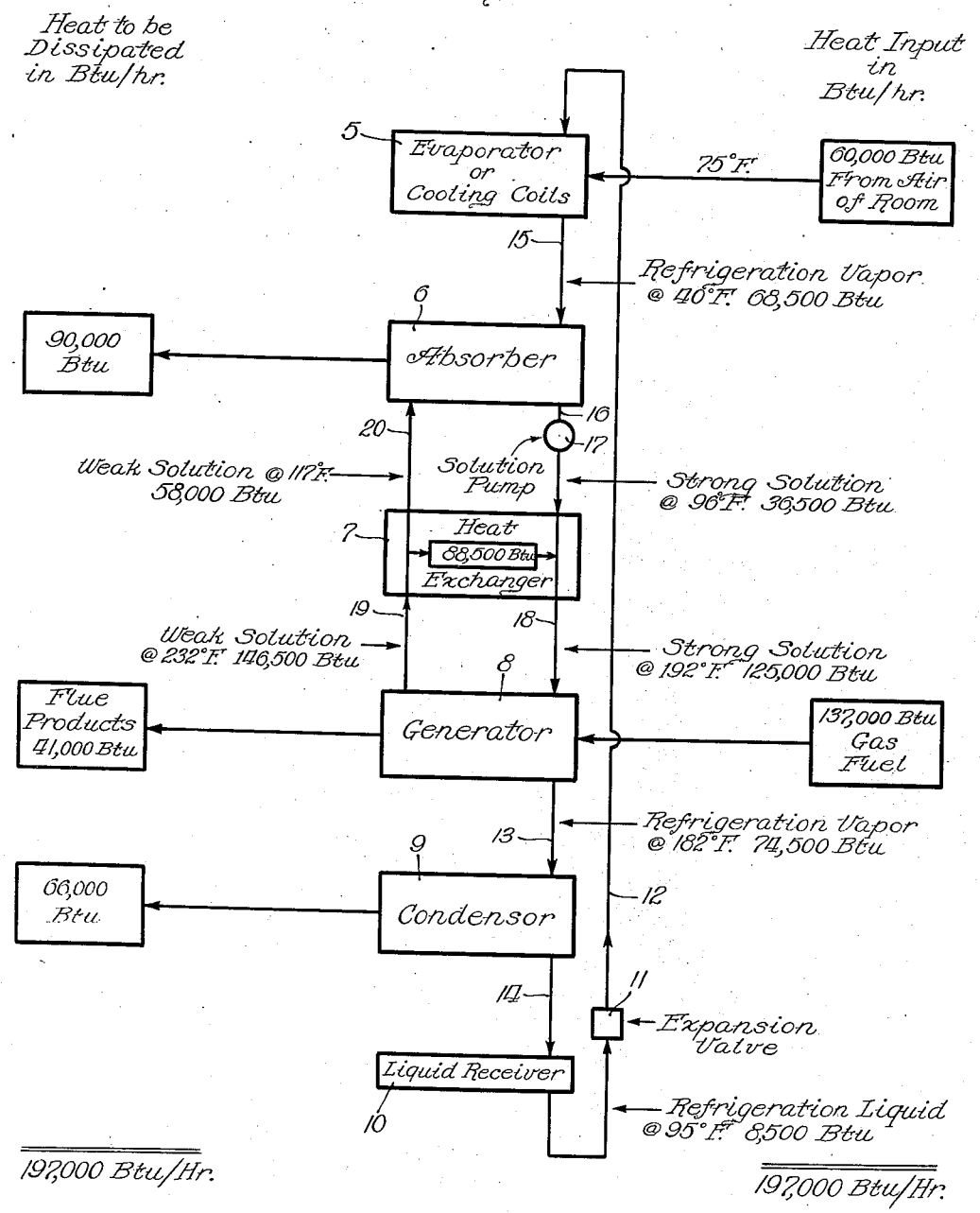
INVENTOR.
Earl L. Tornquist
BY
ATTORNEYS.

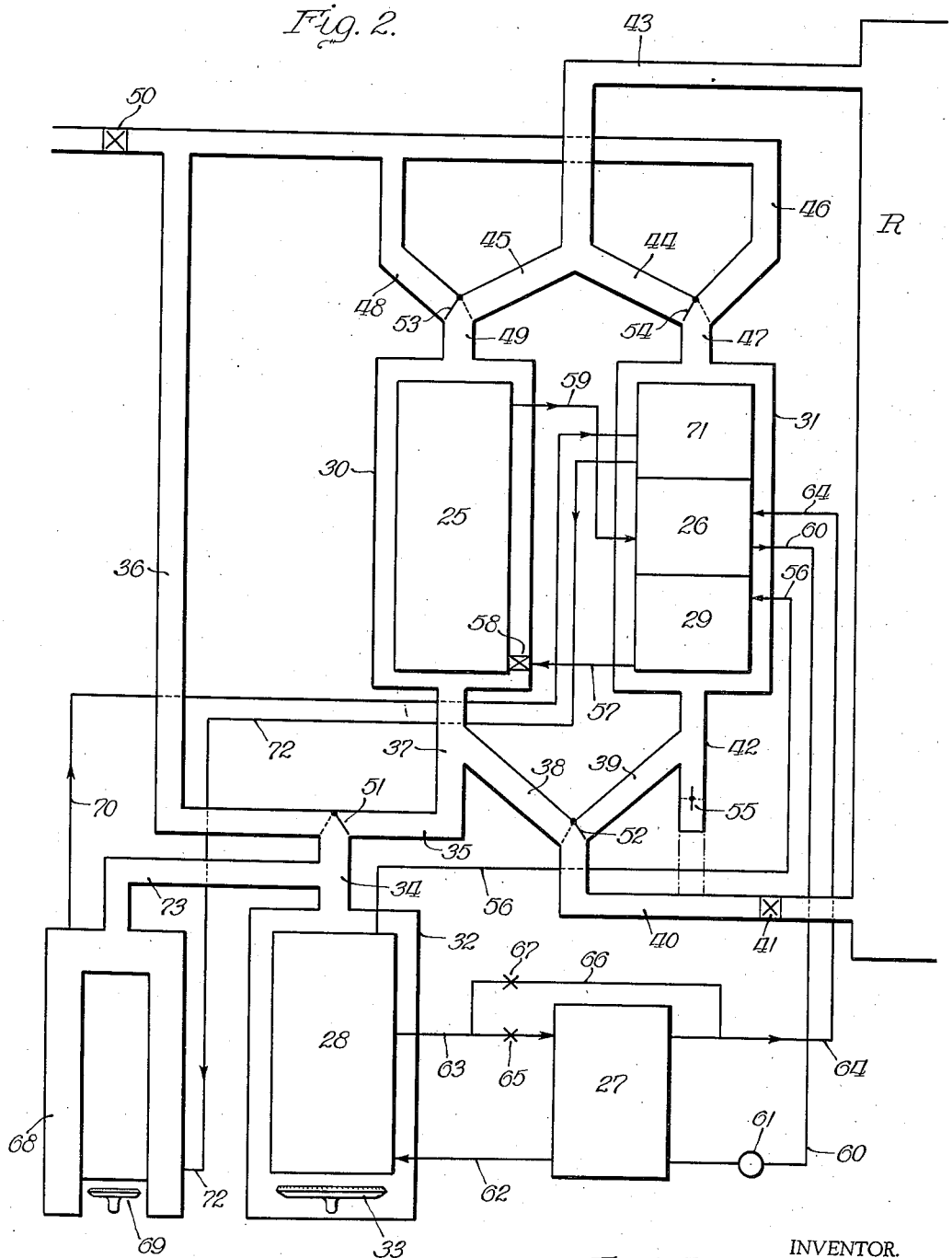

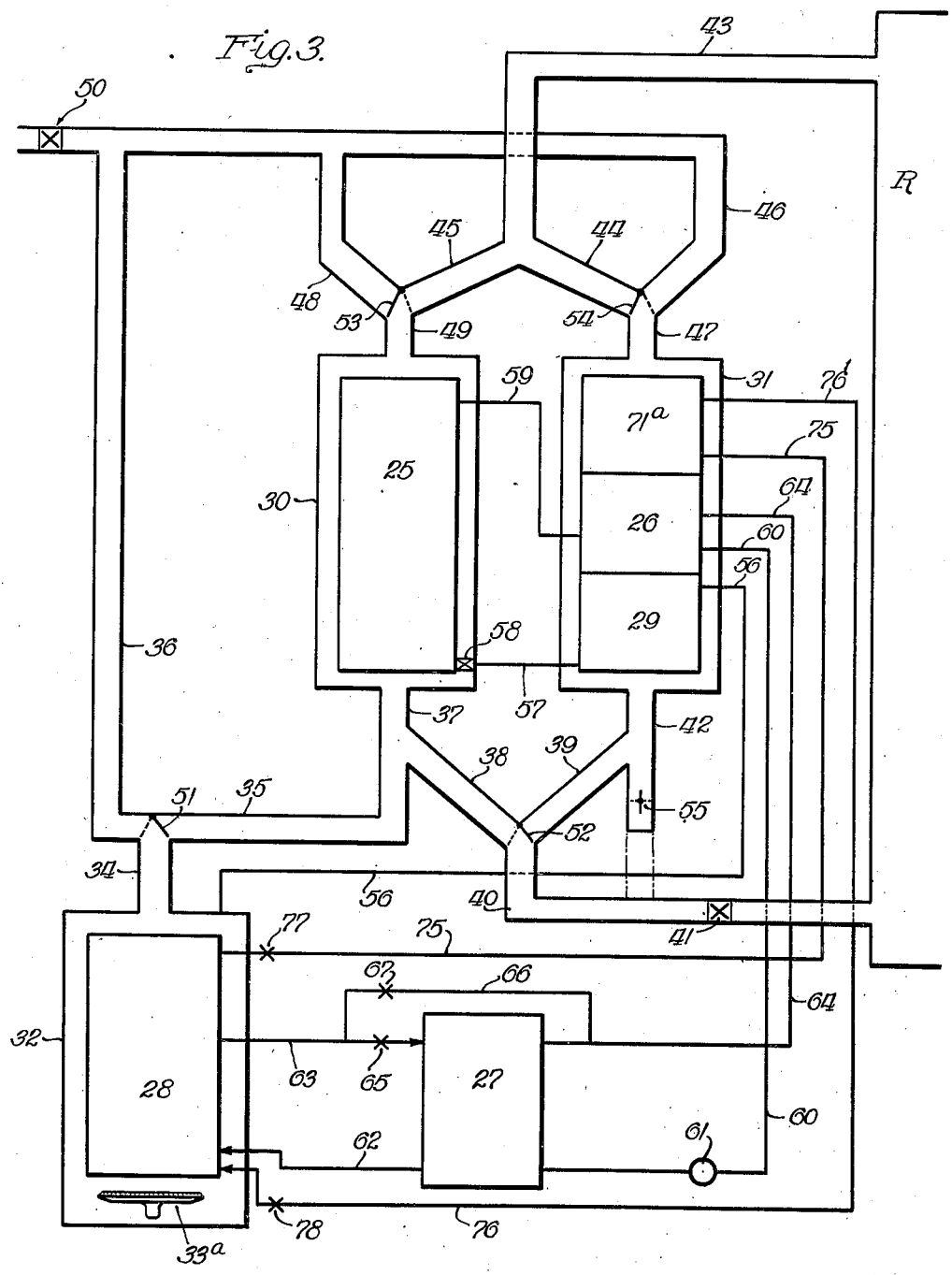

Patented Aug. 27, 1940

2,212,869

UNITED STATES PATENT OFFICE 2,212,869

REVERSIBLE HEATING AND COOLING MEANS AND METHOD

Earl L. Tornquist, Elmhurst, Ill., assignor of one-half to Herbert W. Prafcke, Streator, Ill.

Application September 27, 1938, Serial No. 231,950

24 Claims. (Cl. 257—7)

This invention relates to fluid conditioning, and has to do with a system for and method of heating and cooling by the use, for either purpose, of an absorption type of refrigeration machine or system.

My invention is directed to a system and method of the character stated, in which high efficiency is assured and heat ordinarily wasted is utilized for heating purposes; the heat rendered available from the absorption refrigeration system, for heating purposes, is, under certain conditions, substantially equal to the total heat input of the absorption system when the latter is operating at full capacity for refrigeration purposes; the heat available for heating purposes may be increased and decreased through a considerable range, to suit varying requirements; the amount of low grade heat put into the absorption system through the evaporator may be increased to such value that the absorption system operates at full capacity rendering available for heating purposes dissipated heat in amount substantially equal to that put into the absorption system to maintain it in operation, the means for and method of thus increasing the low grade heat input also rendering available, for heating purposes, high grade heat in considerable amount such that, when combined with the dissipated heat of the absorption system, adequate heat is available to assure efficient heating even in extremely cold weather; and the absorption refrigeration system may be operated at high efficiency, for cooling purposes, during warm or hot weather. Further objects and advantages of my invention will appear from the detail description.

In the drawings:

Figure 1 is a diagrammatic view of an absorption refrigeration machine or system of known type;

Figure 2 is a diagrammatic view of a heating and cooling system embodying my invention, incorporating an absorption refrigeration system of the type illustrated in Figure 1; and Figure 3 is a view similar to Figure 2, illustrating a modified form of my invention.

It will be helpful to an understanding of my invention to consider briefly first the operation of an absorption refrigeration machine of known or conventional type. The essential elements of such a machine are shown diagrammatically in Figure 1, in which the heat values in B. t. u. are stated approximately and in round numbers, for convenience in description. The machine illustrated is assumed to be of five tons capacity, that is, capable of absorbing in twenty-four hours that amount of heat would be evolved by the fusing or melting of five tons of ice. It comprises an evaporator 5, an absorber 6, a heat exchanger 7, a generator 8, a condenser 9, a liquid receiver 10, and an expansion valve 11, all of which may be of any suitable known type and function in a known manner. Suitable means, not shown, is provided for supplying heat to the generator. That heat is at relatively high temperature and is often referred to, by engineers in this art, as high temperature or high grade heat, as distinguished from the heat absorbed by the evaporator, the latter heat being at relatively low temperature and often referred to as low temperature or low grade heat. The terms "high grade heat" and "low grade heat," where used here will be used in that sense.

It is assumed that the refrigerant used is methylene chloride, and that the solvent is dimethyl ether of tetraethylene glocol, though any other refrigerant and solvent may be used. Also, if desired, a rectifier or similar device may be provided, between generator 8 and condenser 9, for separating solvent vapors and refrigerant vapors. That is well known in the art, is not essential to an understanding of the machine, and requires no illustration nor detailed description. Rectifiers are used particularly in absorption refrigeration systems using ammonia as the refrigerant, which systems are included in the broad concept of my invention, as well as any other suitable absorption refrigeration system.

Liquid refrigerant flows from receiver 10 through pipe 12 to evaporator 5, under control of expansion valve 11 and as required. The pressure in the generator 8 is so adjusted that refrigerant vapors driven off in the generator 8 and flowing therefrom through pipe 13 to the condenser 9, from which the liquid refrigerant flows through pipe 14 to the receiver 10, will liquefy at the temperature maintained in the condenser. The refrigerant flowing through pipe 12, from receiver 10, is at a temperature of 95° F. and has a heat content of 8,500 B. t. u. per hour. The evaporator 5 absorbs low grade heat at a temperature of 75° F., from the room or space in which it is located, and absorbs 60,000 B. t. u. per hour. The refrigerant vapor, at a temperature of from 40° F., flows from evaporator 5 through pipe 15 into the absorber 6, where it is absorbed in the solvent and delivers to the absorber 68,500 B. t. u. per hour. The strong solution, at a temperature of 96° F. is delivered from absorber 6 through pipe 16 to the heat exchanger 7, by means of a pump 17, and supplies to the heat exchanger 36,500 B. t. u. per hour. In the heat exchanger 7 the relatively cold strong solution absorbs 88,500 B. t. u. per hour from relatively hot weak solution flowing through the heat exchanger, as will be explained presently, and the strong solution, at a temperature of 192° F., flows from the heat exchanger through pipe 18, into generator 8, to which it delivers 125,000 B. t. u. per hour. The generator absorbs, from the heating means referred to above, 96,000 B. t. u. of heat, which is utilized in the system. In the generator a portion of the refrigerant is dissolved from the solvent, and the refrigerant vapor passes from the generator to the condenser 8 through pipe 13, as stated. The weak solution flows from generator 8, at a temperature of 232° F., through pipe 19 into heat exchanger 7, to which it delivers 146,500 B. t. u. per hour. In the heat exchanger the hot weak solution delivers 88,500 B. t. u. per hour to the relatively cold strong solution, as above stated. The weak solution flows from the heat exhanger, at a temperature of 117° F., through pipe 20, into absorber 6, to which it supplies 58,000 B. t. u. per hour, which completes the cycle.

It will be noted that the absorber 6 receives 68,500 B. t. u. per hour from the evaporator 5, and 58,000 B. t. u. per hour from the heat exchanger 7, or a total of 126,500 B. t. u. per hour. It delivers to the heat exchanger 36,500 B. t. u. per hour, leaving 90,000 B. t. u. of heat which is dissipated by the absorber. The generator utilizes but 96,000 of the 137,000 B. t. u. produced by the heating means, leaving 41,000 B. t. u. per hour which constitutes waste heat dissipated in the flue products. Since the condenser receives 74,500 B. t. u. per hour and delivers but 8,500 B. t. u. per hour, it being assumed that the liquid refrigerant flowing through pipe 14 is at the same temperature as that flowing through pipe 12, i. e., 95° F., it dissipates 66,000 B. t. u. per hour. It will be seen, from the above, that the total heat dissipated by the system, including the heat of the flue products, is 197,000 B. t. u. per hour, and that the total heat put into the system, including the heat of the flue products, is also 197,000 B. t. u. per hour, so that the heat dissipated is equal to the heat put into the system.

In the above explanation certain definite values, have been assumed, and it has also been assumed that there are no heat losses by radiation; in the interests of simplification. A certain amount of heat will be generated by refrigerant entering into solution with the solvent, but an approximately equal amount of heat is utilized in dissolving that refrigerant from the solvent, so that the heat of solution and the heat of dissolution balance each other and may also be disregarded.

One form of a cooling and heating system embodying my invention is shown diagrammatically in Figure 2. It includes an evaporator 25, absorber 26, heat exchanger 27, generator 28 and a condenser 29. Evaporator 25 is enclosed within a suitable casing 30, absorber 26 and condenser 29 are enclosed within a casing 31 and generator 28 is enclosed within a casing 32. The casing, in each instance, is of appropriate interior dimensions to provide for flow of fluid therethrough about and in contact with the part or parts of the system enclosed therein. A suitable source of high grade heat is disposed within casing 32, for heating generator 28. A gas burner 33 has been shown for that purpose, as an example, but any other suitable heat source may be provided.

A conduit 34, extending from the top of casing 32, opens at its upper end into a conduit 35, from the end of which latter conduit extend conduits 36 and 37, the the latter of which opens into casing 30 through the bottom thereof. A branch conduit 38 opens at one end into conduit 37 and, at its other end, into a branch conduit 39, the adjacent ends of branch conduits 38 and 39 opening into one end of a conduit 40, leading from a space or room R to be cooled or heated, which conduit 40 is shown adjacent the floor or bottom of such space, though it may be otherwise suitably located. A fan 41 is disposed within conduit 40 for withdrawing air from space R and causing it to flow through this conduit. Conduit 39 opens, at its other end, into a conduit 42 opening, at its upper end, into casing 31, through the bottom thereof, the lower end of which conduit 42 may be open to a space exterior of space R. An inlet conduit 43 opens at one end into space R, which conduit 43 is shown adjacent the top or ceiling of space R, though it may be otherwise suitably located, and, at its other end, into two branch conduits 44 and 45. Conduit 44 opens into a conduit 46 and the juncture of these two conduits opens into the upper end of a conduit 47 opening, at its lower end, into casing 31 at the top thereof. In like manner, conduit 45 opens into one end of a branch conduit 48, the juncture of conduits 45 and 48 opening into a conduit 49 opening, at its lower end, into casing 30 through the top thereof. Conduit 46 is extended and conduits 36 and 48 open, at their upper ends, into conduit 46. A fan 50 is disposed within conduit 46, outward beyond conduit 36, effective for inducing air through the latter conduit and through conduits 48 and 46. Suitable valves or dampers 51, 52, 53, and 54 are provided at the junctures of certain of the conduits, for controlling communication therebetween, and a valve or damper 55 is provided in conduit 42 for controlling flow of air therethrough. When the system is to be used for cooling or refrigerating purpose, the dampers are in the position shown in full lines.

The system of Figure 2 is assumed, for purposes of explanation, to have the same capacity as that of Figure 1. The refrigerant vapor driven off in the generator 28 flows through pipe 56 to the condenser 29, from which the liquid refrigerant passes to evaporator 25, through pipe 57 and expansion valve 58. The evaporator absorbs 60,000 B. t. u. per hour, as in Figure 1, and the refrigerant vapor passes from the evaporator through pipe 59 into absorber 26. The strong solution flows from absorber 26, through pipe 60, in which there is a circulating pump 61, to the heat exchanger 27, in which it absorbs heat from the relatively hot weak solution, and from the heat exchanger through pipe 62 into generator 28. The hot weak solution flows from generator 28 through pipe 63 into the heat exchanger 27, where it delivers a portion of its heat to the relatively cold strong solution, and from the heat exchanger through pipe 64 to the absorber 26. Pipe 63 is provided with a valve 65, and a pipe 66, provided with a valve 67 and shunting heat exchanger 27, has one end connected to pipe 63, between the generator and valve 65, and its other end connected to pipe 64; for a purpose to be explained presently. When using the system for cooling purposes, valve 67 is closed and valve 65 remains open.

In cooling, the dampers are in the full line positions shown, as noted above. The 41,000 B. t. u. per hour of heat in the flue products flows through conduits 34 and 36 into conduit 46 through which it is discharged by fan 50, which also induces air through conduit 42 and casing 31, which air serves to take off the 156,000 B. t. u. per hour dissipated by the absorber 26 and the condenser 29. In that manner 197,000 B. t. u. of heat per hour is dissipated, the amount of heat dissipated being equal to the amount of heat put into the system, as in Figure 1. Air withdrawn from space R, by fan 41, flows through conduit 40, branch conduit 38 and conduit 37 into casing 30, through which it flows in contact with evaporator 25. The latter absorbs heat from this air, which provides the source of low grade heat entering the system, and the cooled or refrigerated air flows from casing 30 through conduit 49, branch conduit 45 and conduit 43 into space R, which is thus effectively cooled.

When using the system for heating purposes, the dampers are in the positions indicated by dotted lines. The available 41,000 B. t. u. of heat per hour, contained in the flue products and usually wasted, flows through conduits 34, 35 and 37 into casing 30, through the latter in contact with evaporator 25, and thence through conduit 49 and branch conduit 48 to conduit 46, from which products of combustion are discharged by fan 50. The evaporator absorbs, from the flue products 41,000 B. t. u. of heat per hour, these products leaving casing 30 at a temperature of about 50° F. or less. Since the evaporator absorbs but 41,000 B. t. u. per hour, the absorption system is now operating at approximately two thirds of its capacity. Accordingly, the absorber will dissipate approximately 60,000 B. t. u. per hour received from the evaporator, and the condenser will dissipate approximately 44,000 B. t. u. per hour. That renders available, within casing 31, for heating purposes, approximately 104,000 B. t. u. of heat per hour at an approximate temperature of 115° F. The cool air withdrawn from space R, at an approximate temperature of 70° F., flows through conduit 40, branch conduit 39 and conduit 42 into casing 31. This air flows within casing 31, about and in contact with condenser 29 and absorber 26, absorbing the heat dissipated thereby with resulting material increase in its temperature. The air thus heated is delivered from casing 31, through conduit 47, branch conduit 44 and conduit 43 into space R, the heat derived from the condenser and the absorber being sufficient, in most cases, to maintain space R at the desired temperature. In such cases as the condenser and the absorber may be insufficient for the desired heating, the generator 28 provides a reserve source of additional heat. Since the absorption system, when heating, is operating at but approximately two thirds capacity, the generator requires but two thirds of 96,000 B. t. u. per hour to maintain the system in operation. Accordingly, 32,000 B. t. u. of heat per hour is available at the generator for heating purposes. By opening valve 67, and properly adjusting it and valve 65, a selected amount of the hot weak solution, which leaves the generator at an approximate temperature of 232° F., is shunted through pipe 66, in such amount that the 32,000 B. t. u. per hour not required in the generator is delivered to the absorber 26. The hot weak solution entering the absorber is then at an approximate temperature of 160° F., and the absorber dissipates approximately 92,000 B. t. u. per hour. There is then available within casing 31, for heating purposes, approximately 136,000 B. t. u. of heat per hour at an approximate temperature of 130° F., materially increasing the heating capacity of the system.

In climates where extremely cold weather is encountered, auxiliary heat supply means may be provided. I have shown, for that purpose, by way of example, a steam boiler 68 of known type, fired by a gas burner 69. The steam space of boiler 68 is connected by a pipe 70 to the inlet of a heat dissipating coil 71, within the upper portion of casing 31, the outlet of coil 71 being connected, by a condensate return pipe 72, to the water space of the boiler. A conduit 73 connects boiler 68 to conduit 34 and is effective for conveying to the latter the products of combustion from burner 69. The capacity of the latter and of boiler 68 is so chosen that the boiler delivers to coil 71 through pipe 70, 48,000 B. t. u. of heat per hour, available in casing 31 for heating purposes, and the flue products from the boiler deliver to the evaporator 25, through conduits 73, 34, 35 and 37, 19,000 B. t. u. of heat per hour. Since the evaporator 25 now receives 60,000 B. t. u. of heat per hour, the absorption system now operates at full capacity, rendering available within casing 31, for heating purposes, 156,000 B. t. u. of heat per hour dissipated by the absorber 26 and the condenser 29. That, plus the 48,000 B. t. u. of heat per hour dissipated by the coil 71, renders available within casing 31, for heating purposes, 204,000 B. t. u. of heat per hour, thus greatly increasing the heating capacity of the system. In cases where the coil 71 is not required, the boiler 68 may be omitted, burner 69 being then used for supplying to the evaporator 25 low grade heat in the amount of 19,000 B. t. u. per hour, to maintain the absorption refrigeration system in operation at full capacity. That is an obvious variation which requires no illustration nor further description.

It will be understood, of course, that pipe 66 is not used, when the absorption system is operating at full capacity, at which time valve 65 remains open, with valve 67 closed. When it is not necessary to utilize for heating purposes the 48,000 B. t. u. which coil 71 is capable of dissipating, the auxiliary heater may be used as a source of supply of hot water, or for other purposes, coil 71 being disabled in any suitable manner, or left in operation, if desired, such heat as is dissipated by this coil, in the latter case, being available in casing 31, for heating purposes. Under such conditions the absorption system operates it full capacity, since 19,000 B. t. u. of heat per hour is delivered from the burner 69 to evaporator 25, and the amount of heat dissipated by absorber 26 and condenser 29, in casing 31 and there available for heating purposes, is equal to the amount of heat put into the absorption system. The system of Figure 2, when used for heating, thus has a wide range and is highly flexible, to meet requirements according to numerous different conditions encountered in practice.

In Figure 3 the gas burner 33ª is of greater maximum heating capacity than burner 33 of Figure 2, the auxiliary heater 68 of the latter figure is omitted, and heat dissipating coil 71 of Figure 2 is replaced by a heat dissipating coil 71ª connected, by pipes 75 and 76 to generator 28, at the upper and the lower portions thereof. Pipes 75 and 76 are respectively provided with valves 77 and 78, which ordinarily remain closed. The system may then be used for heating in the same manner as the system of Figure 2, when the auxiliary heater 68 of the latter system is not used. In exceptionally cold weather, burner 33ᵃ is so adjusted that its heat output per hour is increased from 137,000 B. t. u. to 204,000 B. t. u., and valves 77 and 78 are opened. That supplies 48,000 B. t. u. of additional heat per hour to the generator and also increases the B. t. u. of heat per hour in the products of combustion, from burner 33ᵃ, from 41,000 to approximately 60,000. The 48,000 B. t. u. of heat per hour is dissipated by coil 71ᵃ within casing 31, where it is available for heating purposes. In addition, since evaporator 25 now absorbs approximately 60,000 B. t. u. of heat per hour, the absorption system is now operating at full capacity, and a further 56,000 B. t. u. of heat per hour is dissipated by absorber 26 and condenser 29, within casing 31, there available for heating purposes. The system of Figure 3 then has the same heating capacity as that of Figure 2, when the auxiliary heater 68 of the latter system is in operation for heating purposes.

Within the broader concepts of my invention, any suitable source of otherwise waste heat may be employed for supplying low grade heat, in desired amount, to the evaporator.

It will be noted that in the heating and cooling systems of both Figures 2 and Figure 3, the fan 50 is effective for creating suction in those conduits and casings through which the products of combustion flow, while fan 41 is effective for creating pressure in those conduits and casings through which the air which is cooled or heated flows. That is advantageous as excluding flue products from the space R. Any other suitable arrangement of fans or fluid propelling means may be provided, within the broader concepts of my invention.

If desired, when using the system for cooling, duct 42 may be extended to duct 40, as indicated by the dot and dash lines, for withdrawing a portion of the cooled air from space R and passing it over the heat dissipating units within casing 31, in the interests of greater economy. That is intended to take care of cases in which a certain amount of outside air is admitted to space R, for ventilation. Also, when using the system for heating, air may be withdrawn from the heated space R, for the same purpose, and passed over the evaporator 25, by appropriate adjustment of valve 52, which contributes to economy in operation. By appropriate adjustments, flow of air through the conduits and the casings may be proportioned in accordance with requirements, as will be readily understood.

The dampers and the valves of the heating and cooling system, and the supply of fuel to the burner, may be adjusted manually or they may be adjusted in any other suitable manner, as by thermo-responsive automatic means well known in the art. It is also intended, in practice, to provide suitable interlocking means, of known type, to assure operation of the adjustable members in proper sequence and relation. Such control and interlocks may be of any suitable type, are well known in the art, and require no illustration nor further description here.

In describing the heating and cooling systems of Figures 2 and 3, it has been assumed that there are no heat losses by radiation, which was also assumed with respect to the absorption refrigeration system or machine of Figure 1, as previously noted. In practice there will be a certain amount of heat loss by radiation, but the loss may be quite small and, for the purposes of explanation of my invention, may be disregarded. It also has been assumed, in describing the heating and cooling systems of Figures 2 and 3, that no change in efficiency or heat levels of the absorption system occurs, when it is operating at reduced capacity, which is approximately correct, such changes as may occur being a matter of design of the system, and they may be disregarded for purposes of this description. When operating the absorption system at two thirds capacity for heating purposes, and utilizing the 32,000 B. t. u. of heat per hour available from the generator, the expansion valve may be appropriately adjusted to that end, if required, as will be understood by those skilled in the art. In the system of Figure 3, the generator is, of course, so designed as to be capable of the maximum heat input indicated for heating purposes, as will be understood.

While the space R has been shown, for purposes of illustration, as a single space, in practice a plurality of spaces, such as the rooms of a house or building, may be connected to the conduits 41 and 43, in a manner well known in the art, such spaces being heated or cooled in the manner above described. It will also be understood that either air or any other suitable fluid may be utilized as the heat exchanging or transferring medium, the systems illustrated being shown as using air, by way of example only.

In some absorption refrigeration systems of known type, a liquid such as a brine solution is used as the medium for conveying heat to the evaporator. When using such an absorption system in the heating and cooling system of my invention, the air or other fluid used as the heat exchange medium may be caused to flow in contact with the coil through which the brine solution or other liquid circulates, in an obvious manner. That would be an obvious variation of the heating and cooling systems herein described in detail, and requires no illustration nor detailed description. Also, the absorber and the condenser may be liquid cooled, as by water, in a known manner, the heat taken up by the cooling liquid being dissipated by known means and, when the heating and cooling system is used for heating purposes, utilized for heating fluid in space R.

If desired, suitable known means may be provided for subjecting the heat dissipating elements of the system, enclosed within casing 31, to a water spray to assist in dissipating the heat, during the refrigerating or cooling cycle, making them of the evaporative type well known in the art. Also, such means, at reduced capacity, may be used during the heating cycle for assuring a proper degree of humidity of the air in the space R. Such spray means is known in the art and need not be illustrated nor further described here. While I have indicated, by way of example, a pump for circulating the refrigerant solution, any other suitable means, known in the art, may be provided for that purpose. Also, while the heat dissipating elements of the absorption refrigeration system illustrated herein, by way of example, are preferably arranged as shown, in practice the arrangement of the heat dissipating elements may vary in accordance with the particular absorption refrigeration system used.

The absorption refrigeration system, illustrated in Fig. 1 and in Figs. 2 and 3, is assumed to have a capacity of five tons, for purposes of description. It will be understood, of course, that the capacity of the absorption system may vary widely and will depend, in a particular case, upon requirements.

As has been indicated herein, changes in the heating and cooling systems of my invention may be resorted to without departing from the field and scope thereof, and I intend to include all such variations, as fall within the scope of the appended claims, in this application in which the preferred forms only of my invention have been disclosed.

I claim.

1. The method of heating the air in a space, which comprises putting into an absorption refrigeration system high grade heat and low grade heat from the same high grade heat fuel burning source, dissipating from the system the heat thus put into it, and heating the air in said space solely by the heat dissipated from the system.

2. The method of heating the air in a space, which comprises putting into an absorption refrigeration system of given capacity high grade heat and low grade heat from the same high grade heat fuel burning source, with the low grade heat less in amount than that required for operation of the system at full capacity and the high grade heat greater in amount than that required to maintain the system in operation at less than full capacity corresponding to the input of low grade heat, dissipating from the system the heat thus put into it, and heating the air in said space solely by the heat dissipated from the system.

3. The method of heating the air in a space, which comprises putting into an absorption refrigeration system of given capacity high grade heat and low grade heat from the same high grade heat source, with the low grade heat less in amount than that required for operation of the system at full capacity and the high grade heat sufficient in amount to maintain the system in operation at full capacity, putting into the system, from a second source of high grade heat, additional low grade heat in amount such that the total low grade heat put into the system is equal in amount to that required for operation of the system at full capacity, dissipating from the system the heat thus put into it, and heating the air in said space by the heat dissipated from the system.

4. The method of heating the air in a space, which comprises putting into an absorption refrigeration system of given capacity high grade heat and low grade heat from the same high grade heat source, with the low grade heat less in amount than that required for operation of the system at full capacity and the high grade heat sufficient in amount to maintain the system in operation at full capacity, putting into the system, from a second source of high grade heat, additional low grade heat in amount such that the total low grade heat put into the system is equal in amount to that required for operation of the system at full capacity, dissipating from the system the heat thus put into it, dissipating high grade heat from said second heat source, and heating the air in said space by the heat dissipated from the system and the high grade heat dissipated from said second source of high grade heat.

5. The method of heating the air in a space, which comprises putting into an absorption refrigeration system of given capacity high grade heat and substantially all of the low grade heat from the same high grade heat source, with the low grade heat in proper amount for operation of the system at full capacity and the high grade heat in amount in excess of that required to maintain the system in operation at full capacity, dissipating from the system the heat thus put into it, and heating the air in said space by the heat dissipated from the system.

6. The method of heating the air in a space, which comprises putting into an absorption refrigeration system of given capacity high grade heat and low grade heat from the same high grade heat source, with the low grade heat in proper amount for operation of the system at full capacity and the high grade heat in amount in excess of that required to maintain the system in operation, dissipating from the system the heat thus put into it for maintaining it in operation at full capacity, dissipating from the system the heat put into it in excess of that for maintaining it in operation at full capacity, and heating the air in said space by the total heat dissipated from the system.

7. The method of heating the air in a space, which comprises burning fuel and thereby producing high grade heat and products of combustion, putting into an absorption refrigeration system the high grade heat thus produced and substantially all of the remaining heat in the products of combustion as low grade heat, dissipating from the system the heat thus put into it, and heating the air in said space by the heat dissipated from the system.

8. The method of heating the air in a space, which comprises burning fuel and thereby producing high grade heat and products of combustion, putting into an absorption refrigeration system of given capacity high grade heat, obtained from such burning of fuel, in amount in excess of that required for operation of the system at full capacity, and as low grade heat substantially all of the remaining heat in the products of combustion and, in amount proper for operation of the system at full capacity, dissipating from the system the heat thus put into it, and heating the air in said space by the heat dissipated from the system.

9. In an air conditioning system of the character described, an absorption refrigeration system including fuel burning means for putting high grade heat into said refrigeration system, means for putting into said refrigeration system low grade heat abstracted from the products of combustion from said fuel burning means, a space to be conditioned, and means for either cooling by said refrigeration system air supplied to said space or heating solely by heat dissipated from said refrigeration system air supplied to said space.

10. In an air conditioning system of the character described, an absorption refrigeration system of given capacity including fuel burning means effective for putting into said refrigeration system high grade heat in amount sufficient to maintain it in operation at full capacity and for producing products of combustion containing available heat in amount less than that required for operation of said refrigeration system at full capacity, means for putting into said refrigeration system as low grade heat substantially all of the heat contained in said products of combustion, a space to be conditioned, and means for alternatively cooling by said refrigeration system air supplied to said space and heating by heat dissipated from said refrigeration system air supplied to said space.

11. In an air conditioning system of the character described, an absorption refrigeration system of given capacity including fuel burning means effective for putting into said refrigeration system high grade heat in amount sufficient to maintain it in operation at full capacity and for producing products of combustion containing available heat in amount less than that required for operation of said refrigeration system at full capacity, auxiliary fuel burning means producing products of combustion containing available heat in amount which added to that of the products of combustion from said first fuel burning means is equal to that required for operation of said refrigeration system at full capacity, means for putting into said refrigeration system low grade heat abstracted from the products of combustion from both of said fuel burning means, a space to be conditioned, and means for alternatively cooling by said refrigeration system air supplied to said space and heating by heat dissipated from said refrigeration system air supplied to said space.

12. In an air conditioning system of the character described, an absorption refrigeration system of given capacity including fuel burning means effective for putting into said refrigeration system high grade heat in amount sufficient to maintain it in operation at full capacity and for producing products of combustion containing available heat in amount less than that required for operation of said refrigeration system at full capacity, auxiliary fuel burning means producing products of combustion containing available heat in amount which added to that of the products of combustion from said first fuel burning means is equal to that required for operation of said refrigeration system at full capacity, means for putting into said refrigeration system low grade heat abstracted from the products of combustion from both of said fuel burning means, a space to be conditioned, means for dissipating high grade heat derived from said auxiliary fuel burning means, and means for alternatively cooling by said refrigeration system air supplied to said space and heating by heat dissipated from said refrigeration system and said auxiliary fuel burning means air supplied to said space.

13. In combination, an absorption refrigeration system of given capacity including fuel burning means effective for putting into said refrigeration system high grade heat in excess of that necessary to maintain it in operation at full capacity and for producing products of combustion containing available heat in amount equal to that required for operation of said refrigeration system at full capacity, means for putting into said refrigeration system as low grade heat substantially all of the remaining heat in the products of combustion, means for dissipating from said refrigeration system the heat put thereinto for full capacity operation and the heat put thereinto in excess of that necessary for full capacity operation, a space for containing a fluid to be conditioned, and means for alternatively cooling the fluid in said space by said refrigeration system and heating it by the heat dissipated from said refrigeration system.

14. In combination, an absorption refrigeration system comprising a generator, an evaporator, an absorber, a condenser, and a heat exchanger; fuel burning means for supplying high grade heat to the generator and producing products of combustion containing heat available for use in the evaporator; means for transmitting to the evaporator as low grade heat substantially all of the available heat in the products of combustion; a space for containing a fluid to be conditioned; and means for alternatively cooling by said refrigeration system the fluid in said space and heating said fluid by the heat dissipated from said absorber and said condenser.

15. In combination, an absorption refrigeration system comprising a generator, an evaporator, an absorber, a condenser, and a heat exchanger; fuel burning means for supplying high grade heat to the generator and producing products of combustion containing heat available for use in the evaporator; means for transmitting to the evaporator as low grade heat the available heat in the products of combustion; means for shunting around said heat exchanger a portion of the hot weak refrigerant solution from said generator to said absorber; a space for containing a fluid to be conditioned; and means for alternatively cooling by said refrigeration system the fluid in said space and heating said fluid by the heat dissipated from said absorber and said condenser.

16. In combination, an absorption refrigeration system comprising a generator, an evaporator, an absorber, a condenser, and a heat exchanger; fuel burning means for supplying high grade heat to the generator and producing products of combustion containing heat available for use in the evaporator; a casing enclosing said evaporator; a second casing enclosing said absorber and said condenser; a third casing enclosing said generator and said fuel burning means; a space containing a fluid to be conditioned; and valve controlled conduit means connecting said space and said casings effective for alternatively flowing fluid from said space through said second casing and flowing the products of combustion from said fuel burning means through said first casing, and flowing fluid from said space through said first casing and disposing of the products of combustion exteriorly of said first casing while passing a cooling fluid through said second casing out of effective heat transfer relation to the fluid in said space.

17. In combination, an absorption refrigeration system comprising a generator, an evaporator, an absorber, a condenser, and a heat exchanger; fuel burning means for supplying high grade heat to the generator and producing products of combustion containing heat available for use in the evaporator; a casing enclosing said evaporator; a second casing enclosing said absorber and said condenser; a third casing enclosing said generator and said fuel burning means; a space containing a fluid to be conditioned; a discharge conduit; a by-pass conduit opening into said discharge conduit; and supplementary valve controlled conduit means connecting said space and casings and discharge and by-pass conduits, effective for alternatively flowing fluid from said space through said first casing and connecting said second casing to said discharge conduit and said third casing to said by-pass conduit, and flowing fluid from said space through said second casing and conducting the products of combustion from said third casing through said first casing and thence to said discharge conduit.

18. In combination, an absorption refrigeration system comprising a generator, an evaporator, an absorber and a heat exchanger; fuel burning means for supplying high grade heat to the generator and producing products of combustion containing heat available for use in the evaporator; a casing enclosing said evaporator; a second casing enclosing said absorber and said condenser; a third casing enclosing said generator and said fuel burning means and provided with an outlet conduit for the products of combustion; a discharge conduit; a space for containing fluid to be conditioned; a supplementary valve controlled conduit system connecting said casings and said conduits effective for alternatively flowing fluid from said space through said first casing while connecting said second casing and the conduit of said third casing to said discharge conduit, and flowing fluid from said space through said second casing while connecting the conduit of said third casing to said first casing and the latter to said discharge conduit; suction means in said discharge conduit disposed outwardly beyond said conduit system; and means for subjecting to pressure fluid flowing through said conduit system.

19. In combination, an absorption refrigeration system comprising a generator, an evaporator, an absorber and a heat exchanger; fuel burning means for supplying high grade heat to the generator and producing products of combustion containing heat available for use in the evaporator; a casing enclosing said evaporator; a second casing enclosing said absorber and said condenser; a third casing enclosing said generator and said fuel burning means and provided with an outlet conduit for the products of combustion; auxiliary fuel burning means having an outlet for products of combustion communicating with said conduit of said third casing; a discharge conduit; a space for containing fluid to be conditioned; and a supplementary valve controlled conduit system connecting said casings and said conduits effective for aternatively flowing fluid from said space through said first casing while connecting said second casing and the conduit of said third casing to said discharge conduit, and flowing fluid from said space through said second casing while connecting the conduit of said third casing to said first casing and the latter to said discharge conduit.

20. In combination, an absorption refrigeration system comprising a generator, an evaporator, an absorber and a heat exchanger; fuel burning means for supplying high grade heat to the generator and producing products of combustion containing heat available for use in the evaporator; a casing enclosing said evaporator; a second casing enclosing said absorber and said condenser; a third casing enclosing said generator and said fuel burning means and provided with an outlet conduit for the products of combustion; auxiliary heating means comprising fuel burning means and having an outlet for products of combustion communicating with said conduit of said third casing; a heat dissipating member within said second casing receiving heat from said auxiliary heating means; a discharge conduit; a space for containing fluid to be conditioned; and a supplementary valve controlled conduit system connecting said casings and said conduits effective for alternatively flowing fluid from said space through said first casing while connecting said second casing and the conduit of said third casing to said discharge conduit, and flowing fluid from said space through said second casing while connecting the conduit of said third casing to said first casing and the latter to said discharge conduit.

21. In combination, an absorption refrigeration system comprising a generator, an evaporator, an absorber and a heat exchanger; fuel burning means for supplying high grade heat to the generator and producing products of combustion containing heat available for use in the evaporator; a casing enclosing said evaporator; a second casing enclosing said absorber and said condenser; a third casing enclosing said generator and said fuel burning means and provided with an outlet conduit for the products of combustion; said absorber having supplementary direct connections to said generator for receiving from the latter hot weak refrigerant solution; a discharge conduit; a space for containing fluid to be conditioned; and a supplementary valve controlled conduit system connecting said casings and said conduits effective for alternatively flowing fluid from said space through said first casing while connecting said second casing and the conduit of said third casing to said discharge conduit, and flowing fluid from said space through said second casing while connecting the conduit of said third casing to said first casing and the latter to said discharge conduit.

22. In a cooling and heating system of the character described, an absorption refrigeration system including means for putting high grade heat into said refrigeration system, means for putting waste heat into said refrigeration system as low grade heat, a space for fluid to be conditioned, and means for either cooling by said refrigeration system fluid in said space or heating solely by heat dissipated from said refrigeration system fluid in said space.

23. In a cooling and heating system of the character described, an absorption refrigeration system including fuel burning means for putting high grade heat into said refrigeration system, means for putting into said refrigeration system low grade heat abstracted from the products of combustion from said fuel burning means, a space for fluid to be conditioned, and means for either cooling by said refrigeration system fluid in said space or heating solely by heat dissipated from said refrigeration system fluid in said space.

24. The method of heating fluid in a space, which comprises putting into an absorption refrigeration system of given capacity high grade heat and substantially all of the low grade heat from fuel burning means, with the low grade heat in proper amount for operation of the system at full capacity and the high grade heat in amount in excess of that required to maintain the system in operation at full capacity, dissipating from the system the heat thus put into it, and heating the fluid in said space by the heat dissipated from the system.

EARL L. TORNQUIST.